US012798332B2

(12) United States Patent

Claywell et al.

(10) Patent No.: US 12,798,332 B2
(45) Date of Patent: Nov. 17, 2026

(54) SWITCHABLE OIL INJECTION INTO ROTOR-STATOR GAP FOR ENGINE/MOTOR BRAKING

(71) Applicant: GM GLOBAL TECHNOLOGY OPERATIONS LLC, Detroit, MI (US)

(72) Inventors: Mark R. Claywell, Birmingham, MI (US); Maqsood Rizwan Ali Khan, Troy, MI (US); James M. Hart, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 18/650,965

(22) Filed: Apr. 30, 2024

(65) Prior Publication Data

US 2025/0332885 A1 Oct. 30, 2025

(51) Int. Cl.

| | |
|---|---|
| ***B60H 1/14*** | (2006.01) |
| ***B60H 1/00*** | (2006.01) |
| ***B60K 1/00*** | (2006.01) |
| ***B60K 11/02*** | (2006.01) |
| ***H02K 1/20*** | (2006.01) |

(52) U.S. Cl.

CPC ......... *B60H 1/143* (2013.01); *B60H 1/00885* (2013.01); *B60K 1/00* (2013.01); *B60K 11/02* (2013.01); *H02K 1/20* (2013.01); *B60K 2001/006* (2013.01)

(58) Field of Classification Search

CPC . H02K 9/19; H02K 1/20; B60H 1/143; B60K 11/02; B60K 1/00

See application file for complete search history.

(56) References Cited

U.S. PATENT DOCUMENTS

| | | | | |
|---|---|---|---|---|
| 4,331,223 | A * | 5/1982 | Charlat | F16D 57/06 188/294 |
| 5,779,008 | A * | 7/1998 | Vogelsang | F01P 5/10 188/296 |
| 11,588,379 | B2 * | 2/2023 | Steinz | F16H 57/0415 |
| 11,888,381 | B2 * | 1/2024 | Folkesson | B60T 1/087 |
| 12,098,766 | B2 * | 9/2024 | Greiter | F16H 57/0445 |
| 12,515,515 | B2 * | 1/2026 | Liu | B60K 11/02 |
| 2008/0035440 | A1 * | 2/2008 | Hoeller | B60T 13/748 188/161 |
| 2015/0171707 | A1 * | 6/2015 | Shoykhet | H02K 9/12 310/54 |
| 2019/0097482 | A1 * | 3/2019 | Huber | B60K 11/02 |
| 2019/0120369 | A1 * | 4/2019 | Staake | F16H 57/045 |
| 2019/0305643 | A1 * | 10/2019 | Huber | H02K 9/193 |
| 2021/0006132 | A1 * | 1/2021 | Steinz | F16H 57/0417 |
| 2022/0135007 | A1 * | 5/2022 | Schidlowski | B60K 1/00 188/2 R |
| 2023/0179051 | A1 * | 6/2023 | Siepker | H02K 1/24 |
| 2025/0332885 | A1 * | 10/2025 | Claywell | B60H 1/143 |

OTHER PUBLICATIONS

U.S. Appl. No. 18/314,927, GM Global Technology Operations LLC.

* cited by examiner

*Primary Examiner* — Michael A Riegelman

(57) ABSTRACT

A vehicle system including: an electric machine configured for incorporation into a powertrain of a vehicle, the electric machine including a rotor, a stator, and a gap defined between the rotor and the stator; a conduit configured to direct oil into the gap; and a flow control device configured to control flow of the oil through the conduit into the gap. Friction between the oil and the rotor warms the oil and slows rotation of the rotor to brake the vehicle when the electric machine is connected to the powertrain.

19 Claims, 5 Drawing Sheets

SWITCHABLE OIL INJECTION INTO ROTOR-STATOR GAP FOR ENGINE/MOTOR BRAKING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle system configured for controlled introduction of oil into a rotor-stator gap of an electric machine for at least one of engine/motor braking, battery heating, and cabin heating.

Electric vehicles include a drive unit with an electric machine. Hybrid vehicles include one or more electric machines at various locations of the powertrain. The electric machine is configured to generate torque to move the vehicle, and may also be configured to brake the vehicle through regenerative braking.

SUMMARY

The present disclosure includes, in various features, a vehicle system including: an electric machine configured for incorporation into a powertrain of a vehicle, the electric machine including a rotor, a stator, and a gap defined between the rotor and the stator; a conduit configured to direct oil into the gap; and a flow control device configured to control flow of the oil through the conduit into the gap. Friction between the oil and the rotor warms the oil and slows rotation of the rotor to brake the vehicle when the electric machine is connected to the powertrain.

In further features, the electric machine is configured as a drive unit of a fully electric vehicle.

In further features, the electric machine is configured for connection to a powertrain of a hybrid electric vehicle.

In further features, the flow control device includes a mechanical valve in cooperation with the rotor, the mechanical valve is configured to open when rotation of the rotor reaches a threshold, which releases the oil into the gap to slow rotation of the rotor and brake the vehicle.

In further features, the conduit includes a pipe extending to the gap between the rotor and the stator.

In further features, the conduit is defined by the stator.

In further features, the conduit includes a first portion defined by a center shaft of the rotor and extending along an axis of rotation of the rotor, and a second portion extending from the first portion through the rotor to the gap.

In further features, the second portion includes a pipe extending through the first portion, the pipe defining an opening in the first portion through which oil flows into the pipe when an oil level within the first portion reaches the opening.

In further features, a heat exchanger is configured to exchange heat between the oil and a coolant of a heating, ventilation, and air conditioning (HVAC) system of the vehicle.

In further features, a heat exchanger is configured to exchange heat between the oil and a coolant of a battery temperature management system.

In further features, the flow control device includes at least one of a pump and a valve; and the vehicle system further includes a controller configured to operate at least one of the pump and the valve to control flow of the oil into the gap based on at least one of a friction torque request and an oil temperature request.

In further features, a heat exchanger configured to exchange heat between the oil and coolant of at least one of a vehicle HVAC system and a battery thermal management system. The controller is configured to increase transfer of heat from the oil to the coolant by at least one of increasing an oil flow rate of the oil through the heat exchanger by increasing a pumping rate of an oil pump, and increasing a coolant flow rate of the coolant through the heat exchanger by increasing a coolant pumping rate of a coolant pump.

In further features, a heat exchanger is configured to exchange heat between the oil and coolant of at least one of a vehicle HVAC system and a battery temperature management system. The controller is configured to actuate a valve to retain the oil within the gap, and increase rotation of the rotor to warm the electric machine.

In further features, the vehicle system further includes a controller configured to disconnect the electric machine from a drivetrain of the vehicle when the vehicle is parked, and increase rotation of the rotor to increase temperature of the oil in the gap.

The present disclosure also includes, in various features, a vehicle system including: an electric machine configured for incorporation into a powertrain of a vehicle, the electric machine including a rotor, a stator, and a gap defined between the rotor and the stator; a conduit configured to direct oil into the gap; a flow control device configured to control flow of the oil through the conduit into the gap where rotation of the rotor warms the oil; a heat exchanger configured to exchange heat between the oil and a coolant of a temperature management system configured to warm a battery of the vehicle; and a controller configured to operate the flow control device to regulate flow of the oil to the gap to warm the oil and the battery to a requested temperature.

In further features, the electric machine is configured as a drive unit of a fully electric vehicle, or configured for connection to a powertrain of a hybrid electric vehicle.

In further features, the conduit is defined by at least one of the rotor and the stator of the electric machine.

The present disclosure further includes, in various features, a vehicle system including: an electric machine configured for incorporation into a powertrain of a vehicle, the electric machine including a rotor, a stator, and a gap defined between the rotor and the stator; a conduit configured to direct oil into the gap; a flow control device configured to control flow of the oil through the conduit into the gap where rotation of the rotor warms the oil; a heat exchanger configured to exchange heat between the oil and a coolant of a heating, ventilation, and air conditioning system configured to warm a cabin of the vehicle; and a controller configured to operate the flow control device to regulate flow of the oil to the gap to warm the oil and the coolant to a requested temperature.

In further features, the conduit is defined by at least one of the rotor and the stator of the electric machine.

In further features, the conduit includes an oil line with a nozzle seated in the gap.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is generally directed to a vehicle system configured for controlled introduction of oil into a gap defined between a rotor and a stator of an electric machine. The electric machine may be configured as the drive unit of a fully electric vehicle. The electric machine may also be configured for incorporation into a hybrid vehicle powertrain. Adding oil into the gap between the rotor and the stator generates friction between the oil and the rotor to slow rotation of the rotor, which brakes the vehicle. The amount of oil introduced into the gap is controllable, which provides braking torque control. The friction also warms the oil. The vehicle system is configured to draw heat from the warmed oil for any suitable use throughout the vehicle. For example, the vehicle system is configured to transfer heat from the oil through any suitable heat exchanger to coolant of a vehicle HVAC system to heat a passenger cabin. The vehicle system is also configured to transfer heat from the oil through a heat exchanger to battery coolant to warm a vehicle battery. Still further, the vehicle system is configured to disconnect the electric machine from the powertrain and spin-up the rotor to increase the temperature of the oil, such as during a cold start while the vehicle is parked, to warm the electric machine and warm the oil for any suitable use throughout the vehicle system. The present disclosure adds only oil to the gap without adding air or any other fluid or other material.

Figure 1:
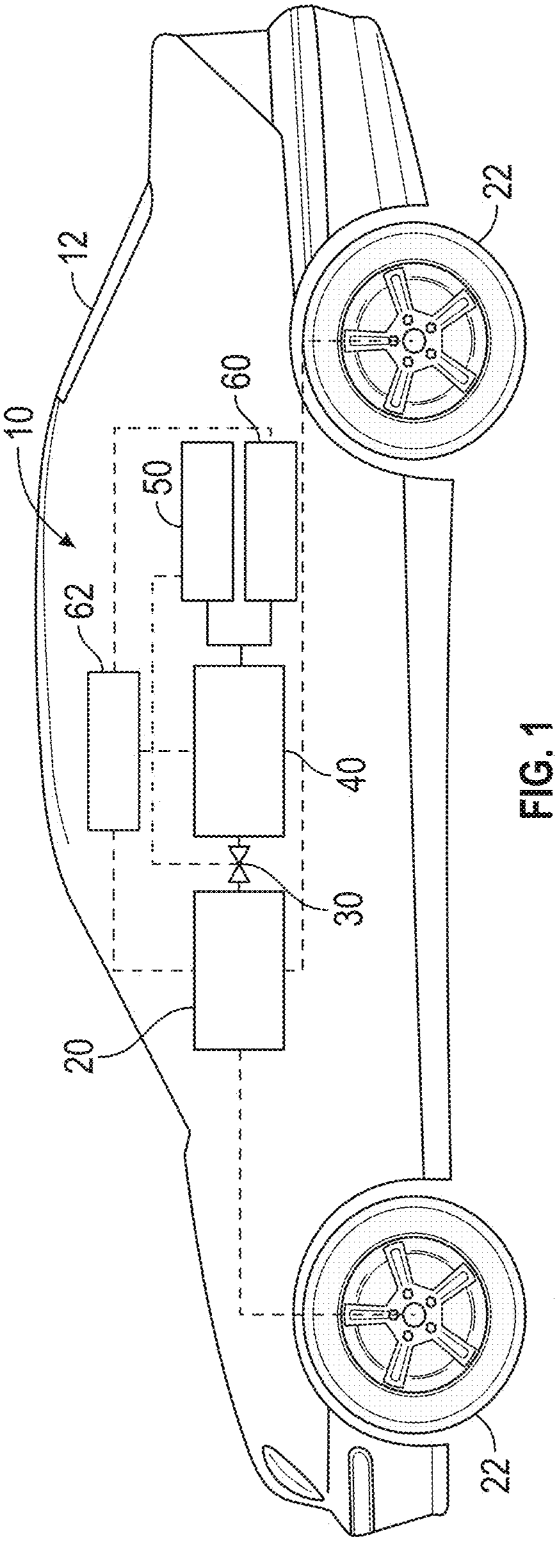
FIG. 1 illustrates an exemplary vehicle system in accordance with the present disclosure.

FIG. 1 illustrates an exemplary vehicle system 10 in accordance with the present disclosure. The vehicle system 10 is configured for use with any suitable vehicle, such as the vehicle 12. The vehicle system 10 may be configured for use with any suitable non-vehicular application as well. The vehicle system 10 generally includes an electric machine 20. The electric machine 20 may be configured as a drive unit for a fully electric vehicle configured to drive the wheels 22. In other applications, the electric machine 20 may be configured for incorporation into a powertrain 70 (FIG. 2) of any suitable hybrid electric vehicle.

Figure 2:
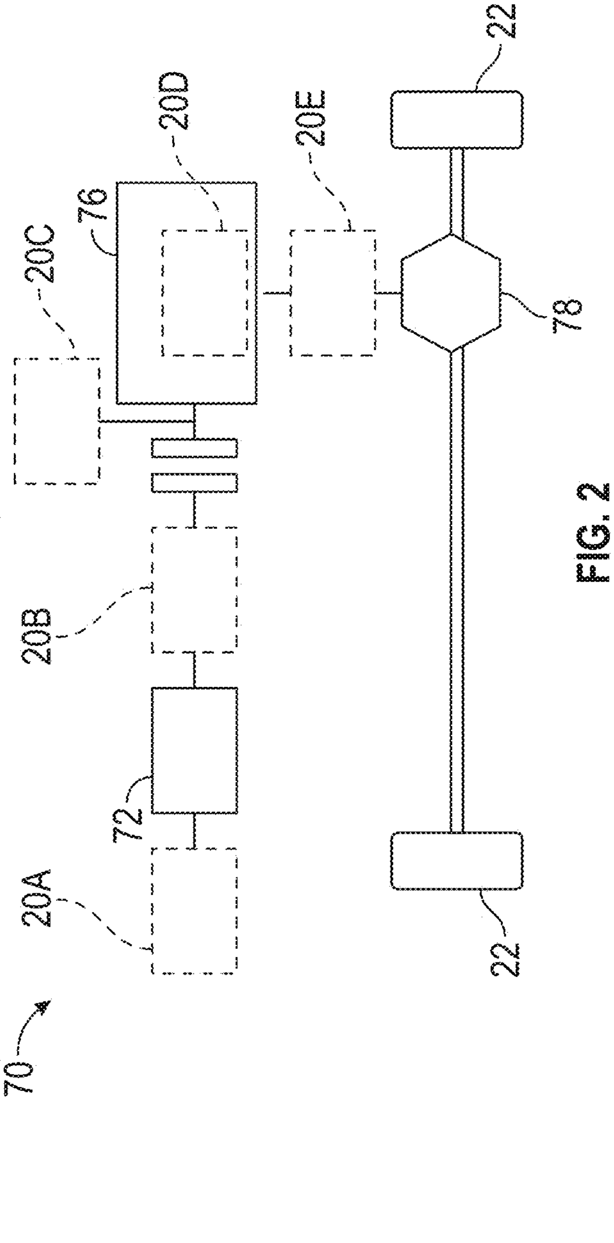
FIG. 2 illustrates an exemplary hybrid electric vehicle powertrain in accordance with the present disclosure.

With respect to the hybrid powertrain 70 of FIG. 2, the electric machine may be incorporated in any suitable manner to generate torque to drive the wheels 22, generate electricity, and brake the vehicle. For example, the electric machine may be configured as electric machine 20A and connected to an internal combustion engine (ICE) 72 at a front-end accessory drive through a belt or any other suitable connection. The electric machine may be configured as electric machine 20B connected directly to a crankshaft of the ICE 72. The electric machine may be configured as electric machine 20C side-attached (such as through a belt) or integrated between the ICE 72 and a transmission 76, in which case the electric machine 20C is decoupled from the ICE 72 and has the same speed of the ICE 72 (or a multiple of it). The electric machine may be configured as electric machine 20D connected through a gear mesh with the transmission 76, in which case the electric machine 20D is decoupled from the ICE 72 and its speed is a multiple of the wheel speed. The electric machine may be configured as electric machine 20E connected through a gear mesh on a rear axle side of the vehicle. The electric machine 20E is decoupled from the ICE 72 and located in a rear axle drive extending to differential 78 or on wheel hubs. The description of specific features of the electric machine 20 herein is also sufficient to describe each one of the electric machines 20, 20A, 20B, 20C, 20D, and 20E unless described to the contrary.

With renewed reference to FIG. 1, the vehicle system 10 further includes a flow control device configured to control flow of oil to the electric machine 20, and specifically to a gap defined between a rotor and a stator of the electric machine 20 as further described herein. The flow control device may include any suitable valve 30 and/or pump 150 (FIGS. 3-7). The valve 30 may be a purely mechanical valve or an electrically actuated valve as described further herein. Both the valve 30 and the pump 150 may be electrically actuated and controlled by a controller 62.

Oil warmed by the electric machine 20 may be selectively directed through a heat exchanger 40. The heat exchanger 40 is any suitable heat exchanger configured to transfer heat from the oil of the electric machine 20 to coolant of a battery temperature management system for heating a battery 50. The battery 50 may be any battery of the vehicle 12, such as a battery configured to power the electric machine 20 (as well as any of the electric machines 20A-20E). The heat exchanger 40 may also be configured to transfer heat from the oil of the electric machine 20 to coolant of a heating, ventilation, and air conditioning (HVAC) system 60 of the vehicle 12. The HVAC 60 is configured to use the heat from the oil to heat a cabin of the vehicle 12.

The vehicle system 10 further includes the controller 62 configured to control the vehicle system 10. For example and as described further herein, the controller 62 is configured to control: speed of the electric machines 20 and 20A-20E; flow rate of oil to the electric machines 20, 20A-20E; flow rate of oil from the electric machines 20, 20A-20E to the heat exchanger 40; operation of the heat exchanger 40 and the battery thermal management system to transfer heat from the oil to the battery 50 to warm the battery 50; and operation of the heat exchanger 40 and the HVAC 60 to transfer heat from the oil to the HVAC 60 to warm the passenger cabin of the vehicle 12. The valve 30 and the pump 150 may each be electrically controlled by the controller 62 to control the flow rate of the oil. The controller 62 may be a single controller or represent a control system including a plurality of controllers.

The present disclosure provides for a plurality of different configurations of the electric machines 20, 20A, 20B, 20C, 20D, and 20E. FIGS. 3, 4, 5, 6, and 7 illustrate exemplary configurations of the electric machine 20 and are described in detail below. The following description of exemplary configurations for the electric machine 20 also applies to each one of the electric machines 20A, 20B, 20C, 20D, and 20E.

Figure 3:
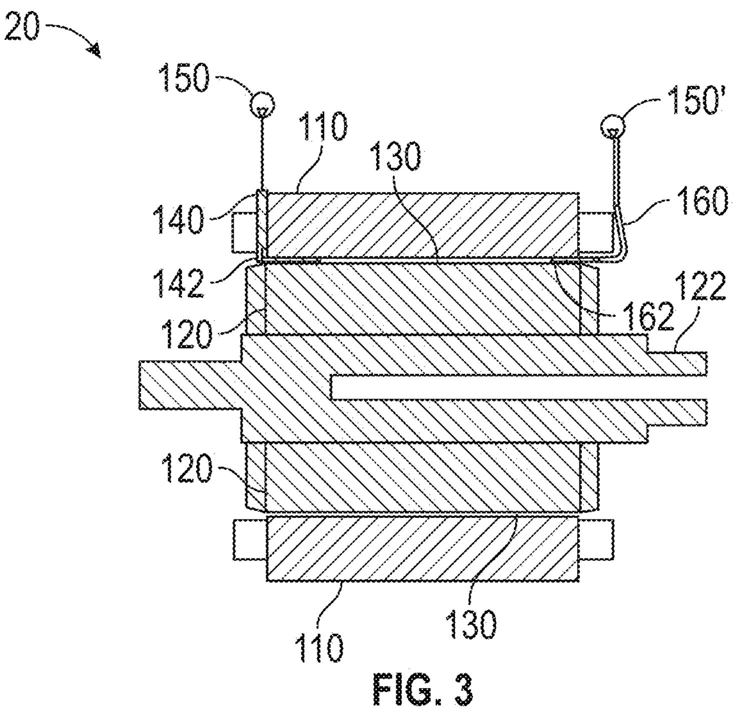
FIG. 3 is a cross-sectional view of an exemplary electric machine configured for inclusion with the vehicle system.

The electric machine 20 includes a stator 110 and a rotor 120 with a center shaft 122. The stator 110 and the rotor 120 define a gap 130 therebetween. The vehicle system 10 includes a conduit configured to direct oil into the gap 130. In the example of FIG. 3, the conduit includes a pipe 140, which may be rectangular in cross-section or have any other suitable shape. The pipe 140 may be made of any suitable material, such as any suitable polymeric material. The pipe 140 extends through the stator 110, such as through wire slots of the stator 110. A nozzle 142 is at a distal end of the pipe 140. The nozzle 142 is directed into the gap 130 to introduce oil into the gap 130 from any suitable oil storage reservoir of the vehicle system 10. Any suitable flow control device is included with the vehicle system 10 to control flow of oil into the gap 130 via the pipe 140 and the nozzle 142, such as a pump 150 and/or the valve 30. The pump 150 is connected to the controller 62 for control by the controller 62. The valve 30 may be a mechanical valve or an electrically actuated valve controlled by the controller 62.

In place of the pipe 140 and nozzle 142, the electric machine 20 may include a conduit in the form of a pipe 160 with a nozzle 162 at a distal tip thereof. The pipe 160 may be made of a metallic material, or any other suitable material. The pipe 160 and the nozzle 162 direct oil into the gap 130 from any suitable oil storage reservoir of the vehicle system 10. The pipe 160 and nozzle 162 may be bent to accommodate complex packaging and extend directly into the gap 130. Any suitable flow control device is included with the vehicle system 10 to control flow of oil into the gap 130 via the pipe 160 and the nozzle 162, such as a pump 150' and/or the valve 30. The pump 150' is connected to the controller 62 for control by the controller 62. The valve 30 may be a mechanical valve or an electrically actuated valve controlled by the controller 62. The electric machine 20 of FIG. 3 may be further configured with channels to direct oil to magnets of the stator to cool the magnets.

Figure 4:
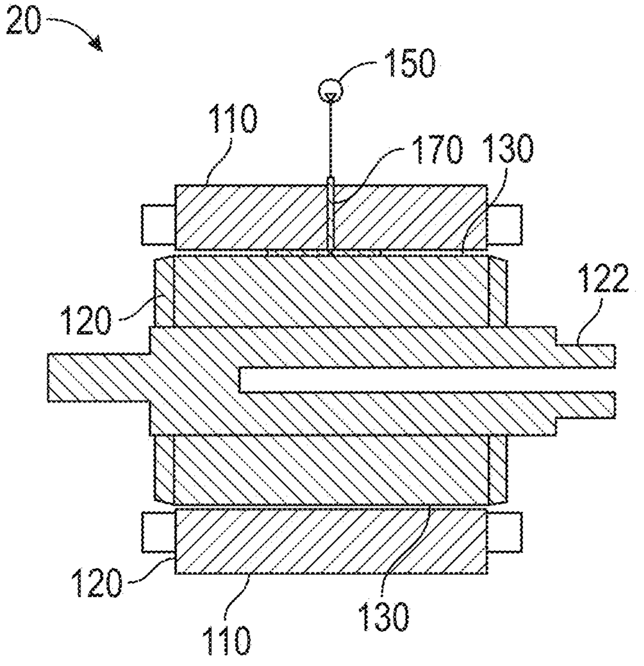
FIG. 4 is a cross-sectional view of another exemplary electric machine configured for the vehicle system.

FIG. 4 illustrates another exemplary configuration of the electric machine 20 in accordance with the present disclosure. The electric machine 20 of FIG. 4 defines a conduit configured to direct oil into the gap 130, the conduit including a passageway 170 through the stator 110 extending from an outer surface of the stator 110 to the gap 130. The passageway 170 extends perpendicular to an axis of rotation of the center shaft 122 of the rotor 120. The pump 150 and/or the valve 30 may be included as flow control devices configured to control flow of oil through the passageway 170 into the gap 130.

Figure 5:
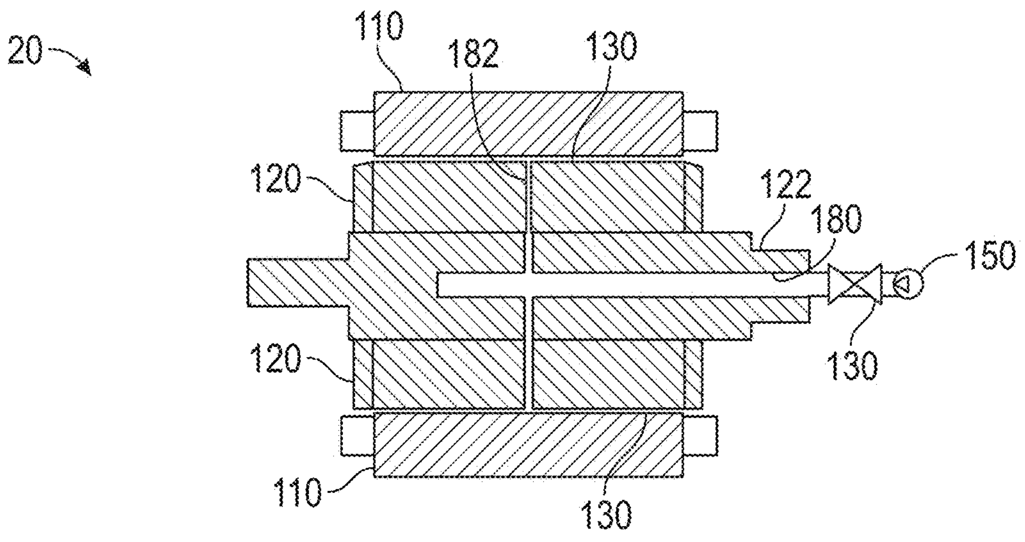
FIG. 5 is a cross-sectional view of an additional exemplary electric machine configured for the vehicle system.

FIG. 5 illustrates an additional exemplary configuration of the electric machine 20 in accordance with the present disclosure. The electric machine 20 of FIG. 5 defines a conduit configured to direct oil into the gap 130, the conduit including a first portion 180 and a second portion 182. The first portion 180 is defined by the center shaft 122 and extends along a rotational axis of the center shaft 122. The second portion 182 is defined by the rotor 120 and extends from the first portion 180 to the gap 130. The pump 150 and/or the valve 30 may be included as flow control devices configured to control flow of oil through the first portion 180 and the second portion 182 into the gap 130.

The valve 30 may be configured as a mechanical valve in cooperation with the center shaft 122 configured to open when rotation of the rotor 120 reaches a threshold speed to release oil into the gap 130 to slow rotation of the rotor 120 and brake the vehicle 12, as well as warm the oil. The valve 30 may be a pressure actuated valve, such as a spring-loaded check valve. The valve 30 may be a centrifugal valve with an axis thereof aligned with the rotational axis of the center shaft 122. With the configuration of FIG. 5, the valve 30 may thus optionally be configured as a fully mechanical valve for mechanical control of oil flow to the gap 130 with or without use of the pump 150. With the electric machine 20 disconnected from the drivetrain of the vehicle 12, rotation of the rotor 120 at or above the threshold speed releases oil into the gap 130 for warming the oil, such as during a cold start. Heat from the warmed oil may be transferred by the heat exchanger 40 to battery coolant for warming the battery 50 and/or the HVAC system 60 for heating the passenger cabin.

Figure 6:
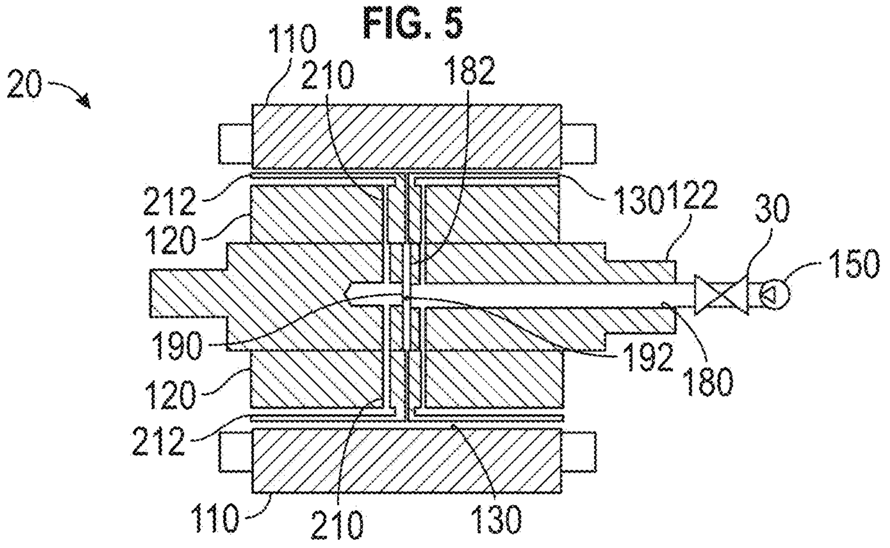
FIG. 6. is a cross-sectional view of a further exemplary electric machine configured for the vehicle system.

FIG. 6 illustrates an additional exemplary configuration of the electric machine 20 in accordance with the present disclosure. The electric machine 20 of FIG. 6 includes a pipe 190 within the second portion 182 of the conduit. The pipe 190 extends across the first portion 180, and defines an opening 192. The opening 192 is at an axial center of the first portion 180 on an axis of rotation of the center shaft 122. The valve 30 and/or the pump 150 may be included to control flow of oil into the first portion 180. The valve 30 may be configured as a pure mechanical valve, as described above in the example of FIG. 5, or an electrical valve configured to be controlled by the controller 62. The electric machine 20 of FIG. 6 further includes a cooling conduit 210 defined by the rotor 120. The cooling conduit 210 extends from the first portion 180 or the oil conduit, along magnets of the rotor 120, and to an outlets 212 of the rotor 120. Upon introduction of relatively cool oil into the first portion 180 while the center shaft 122 is rotating, the oil enters the cooling conduct 210 and flows along magnets of the rotor 120 to cool the magnets before exiting through outlets 212 defined by the rotor 120. As more oil is introduced into the first portion 180, a fill level of the oil will reach the opening 192 of the pipe 190 causing oil to enter the pipe 190. Upon entering the pipe 190, rotation of the rotor 120 causes the oil to flow through the second portion 182 of the conduit into the gap 130.

Figure 7:
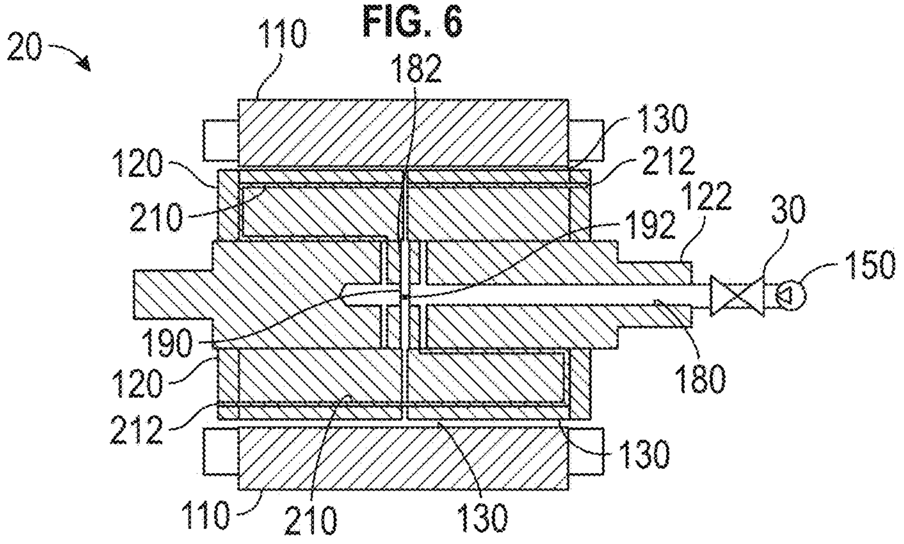
FIG. 7 is a cross-sectional view of yet another exemplary electric machine configured for the vehicle system.

In the example of FIG. 6, the cooling conduit 210 includes separate cooling channels on opposite sides of the pipe 190 and the second portion 182 of the oil conduit. The configuration of the electric machine 20 of FIG. 7 is similar to the configuration of FIG. 6. Unlike the configuration of FIG. 6, the cooling conduits 210 each extend across the rotor 120 so as to overlap the second portion 182 of the oil conduit. The cooling conduits 210 are separate from the second portion 182 so as to not communicate with the second portion 182.

Figure 8:
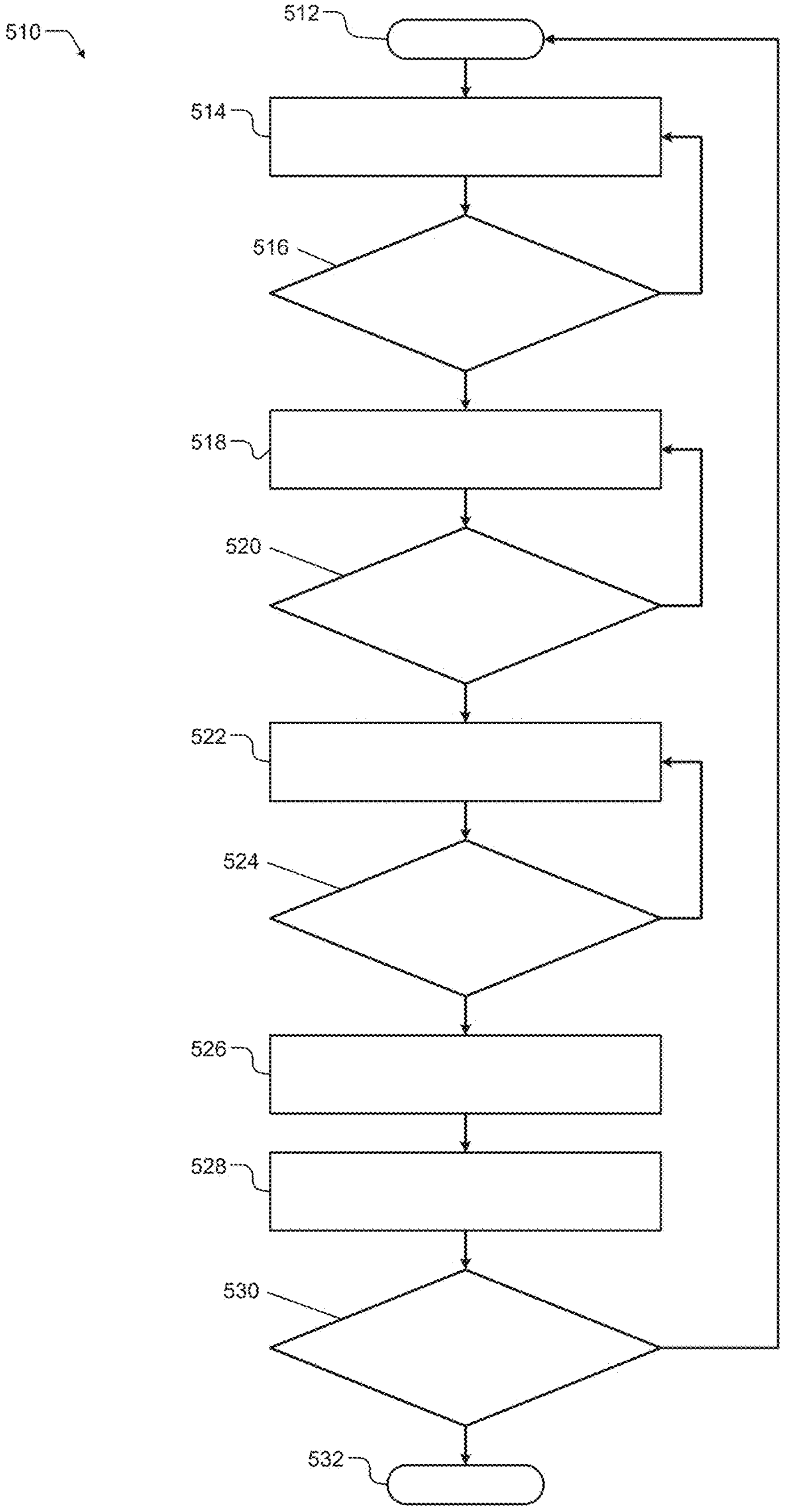
FIG. 8 is a flow chart in accordance with the present disclosure illustrating exemplary control of a vehicle system to warm oil with an electric machine.

FIG. 8 illustrates an exemplary method 510 in accordance with the present disclosure for operating an electric machine of a vehicle system to warm oil in a gap between a rotor and a stator thereof. The method 510 may be performed by the vehicle system 10, or any other suitable vehicle system. And the method 510 may include use of one or more of the electric machines 20, 20A, 20B, 20D, 20D, 20E, or any other suitable electric machine. The method 510 is described below as being performed by the electric machine 20 for exemplary purposes only. The method 510 is described below as being performed by the controller 62, but any other suitable controller may be used.

The method 510 starts at block 512, and at block 514 the controller 62 receives various inputs from the vehicle system 10 as measured by any suitable sensors of the vehicle system 10. The inputs include a request for heat from the battery 50 when temperature of the battery falls below a threshold, and/or a request for heat from the HVAC 60 when temperature of the passenger cabin is below a called for temperature.

The inputs further include current temperature of the oil of the electric machine 20 and the heat exchanger 40, through which oil from the gap 130 of the electric machine 20 is circulated. The controller 62 also receives an input indicating the current state of charge of the battery 50.

From block 514, the method 510 proceeds to block 516. At block 516, the controller 62 checks the battery charge percentage of the battery 50 to determine whether the battery charge percentage is greater than a minimum level. If the charge percentage is below a minimum level, the method 510 returns to block 514 and holds until the charge percentage is increased above the minimum level. This is because heating the oil in the electric machine 20 requires current from the battery 50 to rotate the rotor 120 against friction generated by the presence of the oil in the gap 130. If the battery charge percentage is above the minimum level, the method 510 proceeds to block 518.

At block 518, the heat request received at block 514 is converted to an equivalent motor friction torque of the electric machine 20. In other words, at block 518 the controller 62 determines how much friction torque is required from the electric machine 20 to heat the oil in the gap 130 to the requested temperature. This determination may be made based on a lookup table stored in the controller 62, or in any other suitable manner. From block 518, the method 510 proceeds to block 520.

At block 520, the controller determines whether the required motor friction torque is greater than a minimum torque threshold. For example, at low speeds the electric machine 20 is generating a small amount of torque. Adding oil to the gap 130 to increase friction when the electric machine 20 is generating only a small amount of torque is not optimal. Thus, if the available torque is not greater than a minimum threshold, the method 510 returns to block 518. When the available torque is greater than a minimum threshold, which may vary based on the required motor friction torque, the method 510 proceeds from block 520 to block 522.

At block 522, the controller 62 identifies the excess oil flow rate required for oil introduced into the gap 130 to achieve the required friction torque, which was identified at block 518. The controller 62 is configured to make this determination based on a stored lookup table identifying the excess oil flow rates required to achieve various levels of friction torque. From block 522, the method 510 proceeds to block 524. At block 524, the method 510 determines whether the available friction torque is greater than, or equal to, the friction torque required to heat the oil to the requested temperature. If the available friction torque is less than what is required, the method 510 returns to block 522 until the available friction torque is increased. If the available friction torque is greater than or equal to the required friction torque, the method proceeds to block 526.

At block 526, the controller 62 operates any suitable flow control device of the vehicle system 10 (such as the valve 30 and/or the pump 150, 150') to pump oil into the gap 130 at the excess oil flow rate. From block 526, the method 510 proceeds to block 528. At block 528, the controller 62 checks the friction torque generated by the electric machine 20 to determine whether the actual torque generated equals the required friction torque. If the actual torque is less than the required torque, the controller 62 is configured to update the motor torque control of the electric machine 20 to request additional friction torque. From block 528, the method 510 proceeds to block 530. At block 530, the controller 62 checks the temperature of the oil within the gap 130 and/or the oil flowing to the heat exchanger 40 to determine whether the target oil temperature has been reached. If the target temperature of the oil has not been reached, the method 510 returns to block 512 to repeat the method 510 until the target oil temperature is reached. Once the target oil temperature is reached, the method 510 proceeds to end block 532.

Figure 9:
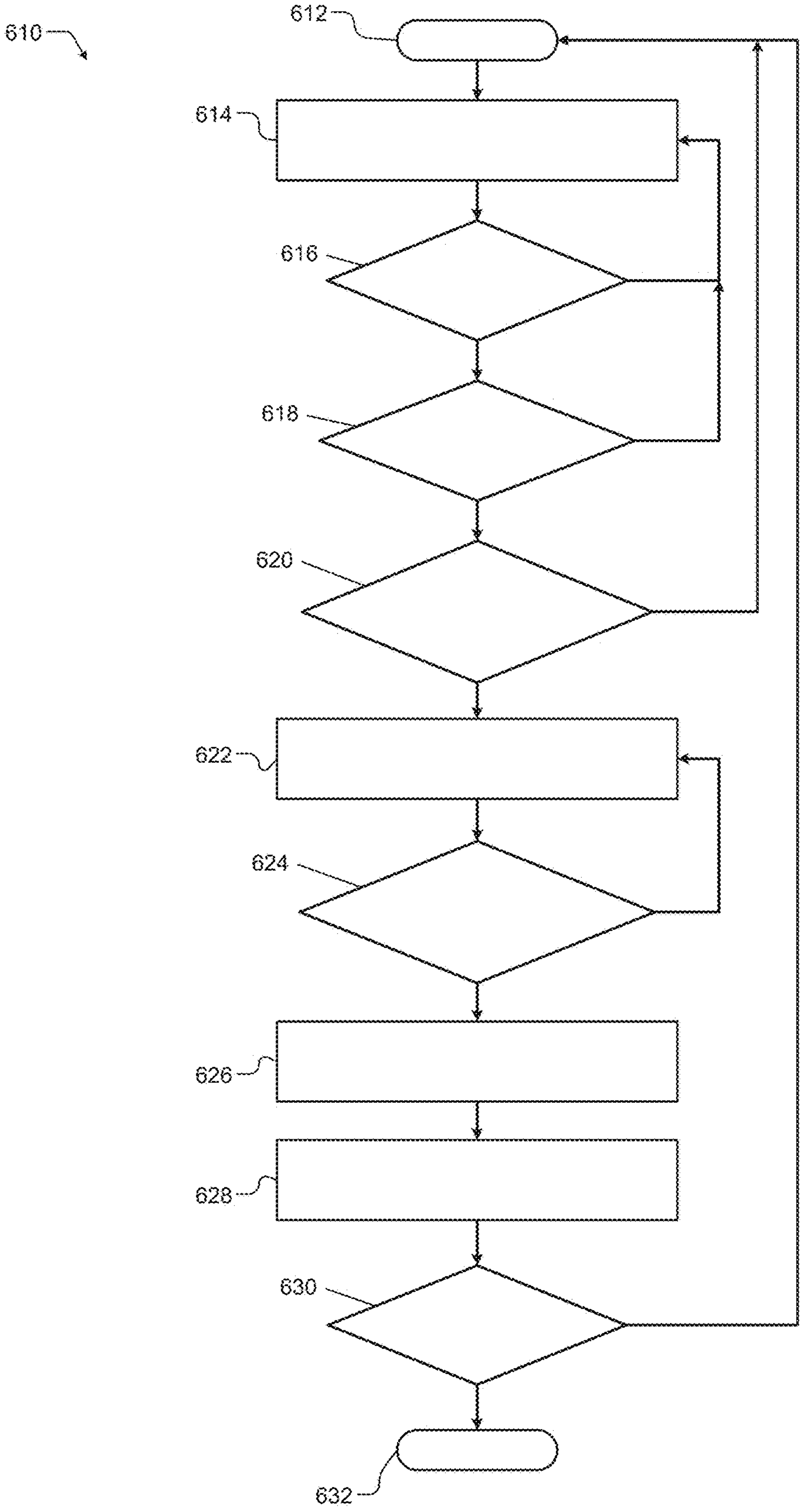
FIG. 9 is a flow chart in accordance with the present disclosure illustrating exemplary control of a vehicle system to generate braking torque with an electric machine.

FIG. 9 illustrates an exemplary method 610 in accordance with the present disclosure for operating an electric machine of a vehicle system 10 to brake the vehicle 12 by using any one of the electric machines 20, 20A, 20B, 20C, 20D, 20E as a friction brake. The method 610 may be performed by the vehicle system 10, or any other suitable vehicle system. And the method 610 may include use of one or more of the electric machines 20, 20A, 20B, 20D, 20D, 20E, or any other suitable electric machine. The method 610 is described below as being performed by the electric machine 20 for exemplary purposes only. The method 610 is described below as being performed by the controller 62, but any other suitable controller may be used.

The method 610 starts at block 612, and at block 614 the controller receives various inputs from the vehicle system 10 as measured by any suitable sensors of the vehicle system 10. The inputs include a brake request to slow the vehicle 12 from any suitable brake sensor. The inputs further include current temperature of the oil of the electric machine 20 and current state of charge of the battery 50. From block 614, the method 610 proceeds to block 616.

At block 616, the controller 62 checks the battery charge percentage of the battery 50 to determine whether the battery charge percentage is less than a limit charge level. If the charge percentage is not below the limit, the method returns to block 614 until the charge percentage is below the limit. Once the battery charge percentage is below the limit, the method 610 proceeds to block 618.

At block 618, the controller 62 checks the temperature of the oil to determine whether the temperature is below a predetermined limit. If the temperature of the oil is not below the limit, the method 610 returns to block 614 until the temperature is below the limit. Proceeding with the braking method when the temperature of the oil is too high will not allow the electric machine 20 to perform optimally. If the temperature of the oil is below the limit, the method 610 proceeds to block 620.

At block 620, the controller determines whether the required motor friction torque is greater a minimum torque threshold. For example, at low speeds the electric machine 20 is generating a small amount or torque. Adding oil to the gap 130 to increase friction when the electric machine 20 is generating only a small amount of torque is not optimal. Thus, if the available torque is not greater than a minimum threshold, the method 610 returns to start block 612. When the available torque is greater than a minimum threshold, which may vary based on the required motor friction torque, the method 610 proceeds from block 620 to block 622.

At block 622, the controller 62 identifies the excess oil flow rate required for oil introduced into the gap 130 to achieve the required friction torque to satisfy the brake request. The controller 62 is configured to make this determination based on a stored lookup table identifying the excess oil flow rates required to achieve various levels of friction torque. From block 622, the method 610 proceeds to block 624. At block 624, the method 610 determines whether the available friction torque is greater than, or equal to, the friction torque required to satisfy the brake request. If the available friction torque is less than what is required, the method 610 returns to block 622 until the available friction torque is increased. If the available friction torque is greater than or equal to the required friction torque, the method proceeds to block 626.

At block 626, the controller 62 operates any suitable flow control device of the vehicle system 10 (such as the valve 30 and/or the pump 150, 150') to pump oil into the gap 130 at the excess oil flow rate. From block 626, the method 610 proceeds to block 628. At block 628, the controller 62 checks the friction torque generated by the electric machine 20 to determine whether the actual torque generated equals the required friction torque. If the actual torque is less than the required torque, the controller 62 is configured to update the motor torque control of the electric machine 20 to request additional friction torque. From block 628, the method 610 proceeds to block 630. At block 630, the controller 62 checks the temperature of the oil within the gap 130 and/or the oil flowing to the heat exchanger 40 to determine whether the target torque has been reached. If the target torque of the electric machine 20 has not been reached, the method 610 returns to block 612 to repeat the method 610 until the target braking torque is achieved. Once the target torque is reached, the method 610 proceeds to end block 632. FIGS. 8 and 9 illustrate examples of operation for the controller 62 in accordance with the present disclosure. The controller 62 is further configured to control all other features of the vehicle system 10 described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system comprising:

an electric machine configured for incorporation into a powertrain of a vehicle, the electric machine including a rotor, a stator, and a gap defined between the rotor and the stator;

a conduit configured to direct oil into the gap; and a flow control device configured to control flow of the oil through the conduit into the gap;

wherein friction between the oil and the rotor warms the oil and slows rotation of the rotor to brake the vehicle when the electric machine is connected to the powertrain; and wherein the flow control device includes a mechanical valve in cooperation with the rotor, the mechanical valve configured to open when rotation of the rotor reaches a threshold, which releases the oil into the gap to slow rotation of the rotor and brake the vehicle.

2. The vehicle system of claim 1, wherein the electric machine is configured as a drive unit of a fully electric vehicle.

3. The vehicle system of claim 1, wherein the electric machine is configured for connection to a powertrain of a hybrid electric vehicle.

4. The vehicle system of claim 1, wherein the conduit includes a pipe extending to the gap between the rotor and the stator.

5. The vehicle system of claim 1, wherein the conduit is defined by the stator.

6. The vehicle system of claim 1, wherein the conduit includes a first portion defined by a center shaft of the rotor and extending along an axis of rotation of the rotor, and a second portion extending from the first portion through the rotor to the gap.

7. The vehicle system of claim 6, wherein the second portion includes a pipe extending through the first portion, the pipe defining an opening in the first portion through which oil flows into the pipe when an oil level within the first portion reaches the opening.

8. The vehicle system of claim 1, further comprising a heat exchanger configured to exchange heat between the oil and a coolant of a heating, ventilation, and air conditioning (HVAC) system of the vehicle.

9. The vehicle system of claim 1, further comprising a heat exchanger configured to exchange heat between the oil and a coolant of a battery temperature management system.

10. The vehicle system of claim 1, wherein:

the flow control device includes at least one of a pump and a valve; and the vehicle system further includes a controller configured to operate at least one of the pump and the valve to control flow of the oil into the gap based on at least one of a friction torque request and an oil temperature request.

11. The vehicle system of claim 10, further comprising:

a heat exchanger configured to exchange heat between the oil and coolant of at least one of a vehicle HVAC system and a battery thermal management system;

wherein the controller is configured to increase transfer of heat from the oil to the coolant by at least one of increasing an oil flow rate of the oil through the heat exchanger by increasing a pumping rate of an oil pump, and increasing a coolant flow rate of the coolant through the heat exchanger by increasing a coolant pumping rate of a coolant pump.

12. The vehicle system of claim 10, further comprising:

a heat exchanger configured to exchange heat between the oil and coolant of at least one of a vehicle HVAC system and a battery temperature management system;

wherein the controller is configured to actuate a valve to retain the oil within the gap, and increase rotation of the rotor to warm the electric machine.

13. The vehicle system of claim 1, wherein the vehicle system further includes:

a controller configured to disconnect the electric machine from a drivetrain of the vehicle when the vehicle is parked, and increase rotation of the rotor to increase temperature of the oil in the gap.

14. A vehicle system comprising:

an electric machine configured for incorporation into a powertrain of a vehicle, the electric machine including a rotor, a stator, and a gap defined between the rotor and the stator;

a conduit configured to direct oil into the gap;

a flow control device configured to control flow of the oil through the conduit into the gap where rotation of the rotor warms the oil;

a heat exchanger configured to exchange heat between the oil and a coolant of a temperature management system configured to warm a battery of the vehicle; and a controller configured to:

operate the flow control device to regulate flow of the oil to the gap to warm the oil and the battery to a requested temperature; and disconnect the electric machine from a drivetrain of the vehicle when the vehicle is parked, and increase rotation of the rotor to increase temperature of the oil in the gap.

15. The vehicle system of claim 14, wherein the electric machine is configured as a drive unit of a fully electric vehicle, or configured for connection to a powertrain of a hybrid electric vehicle.

16. The vehicle system of claim 14, wherein the conduit is defined by at least one of the rotor and the stator of the electric machine.

17. A vehicle system comprising:

an electric machine configured for incorporation into a powertrain of a vehicle, the electric machine including a rotor, a stator, and a gap defined between the rotor and the stator;

a conduit configured to direct oil into the gap;

a flow control device configured to control flow of the oil through the conduit into the gap where rotation of the rotor warms the oil;

a heat exchanger configured to exchange heat between the oil and a coolant of a heating, ventilation, and air conditioning system configured to warm a cabin of the vehicle; and a controller configured to:

operate the flow control device to regulate flow of the oil to the gap to warm the oil and the coolant to a requested temperature; and disconnect the electric machine from a drivetrain of the vehicle when the vehicle is parked, and increase rotation of the rotor to increase temperature of the oil in the gap.

18. The vehicle system of claim 17, wherein the conduit is defined by at least one of the rotor and the stator of the electric machine.

19. The vehicle system of claim 17, wherein the conduit includes an oil line with a nozzle seated in the gap.

* * * * *